UNITED STATES PATENT OFFICE.

GEORGE H. BUCK, OF UTE CREEK, TERRITORY OF NEW MEXICO, ASSIGNOR OF ONE-HALF OF HIS RIGHT TO LYSANDER FLAGG, OF CENTRAL FALLS, RHODE ISLAND.

CATARRH-SNUFF.

SPECIFICATION forming part of Letters Patent No. 233,656, dated October 26, 1880.

Application filed February 16, 1880.

*To all whom it may concern:*

Be it known that I, GEORGE H. BUCK, a citizen of the United States, residing at Ute Creek, in the county of Colfax, Territory of New Mexico, have invented certain new and useful Improvements in Compounds Forming a Snuff for Catarrh; and I do hereby declare the following to be a full, clear, and exact description of the invention, such as will enable others skilled in the art to which it appertains to make and use the same.

My invention relates to a new and useful compound to be used as a snuff in the cure of cases of catarrh, hay-fever, rose-catarrh, colds, &c.

My improved composition consists of the following ingredients, combined in the proportions hereinafter named, viz: the herb of St. Peter, or "Yerbo de San Pedro," as it is locally termed, (*Senecio fendleri*,) one part, by weight, and "Green Herb," or "Yerbo Verde," as it is also locally known, (*Solidago virgaurea*,) four parts, by weight; but I do not confine myself to the exact proportions named, as the proportion of either ingredient may be varied with good results, but I prefer the proportions named.

To produce a good article the herbs must be carefully selected, gathered, and cured. In the cured state they are then separately ground and bolted, and the two ingredients mixed in the proportions given; but, if desired, the cured herbs may be carefully mixed in the proportions stated and afterward ground and bolted; but I prefer the first mode, it being the better plan.

The compound thus prepared is intended to be used as a snuff for catarrhal disorders and other like diseases.

Having described my invention, what I claim as new, and desire to secure by Letters Patent, is—

A compound composed of *Senecio fendleri*, and *Solidago virgaurea*, in the proportions set forth, and for the purposes described.

In testimony whereof I affix my signature in presence of two witnesses.

GEORGE H. BUCK.

Witnesses:
ANDREW BEARDSLEE,
WILLIAM S. JOHNSON.